United States Patent [19]
Ito et al.

[11] Patent Number: 5,883,481
[45] Date of Patent: Mar. 16, 1999

[54] CONTROL SYSTEM FOR ELECTRIC VEHICLE

[75] Inventors: Hisahiro Ito; Tomoyuki Itoh; Shinji Yoshikawa; Yuji Saito, all of Wako, Japan

[73] Assignee: Honda Giken Kogyo Kabushiki Kaisha, Tokyo, Japan

[21] Appl. No.: 922,562

[22] Filed: Sep. 3, 1997

[30] Foreign Application Priority Data

Mar. 9, 1996 [JP] Japan ..................................... 8-233412

[51] Int. Cl.$^6$ ...................................................... G05B 5/00
[52] U.S. Cl. .......................... 318/445; 318/560; 318/449; 318/450; 318/461; 318/465; 318/466; 318/468; 318/469
[58] Field of Search ..................................... 318/560, 445, 318/449, 450, 461, 465, 466, 468, 469

[56] References Cited

U.S. PATENT DOCUMENTS

| | | | |
|---|---|---|---|
| 5,757,153 | 5/1998 | Ito et al. | 318/139 X |
| 5,758,014 | 5/1998 | Young | 388/815 |
| 5,771,475 | 6/1998 | Tabata et al. | 318/599 |

*Primary Examiner*—Karen Masih
*Attorney, Agent, or Firm*—Nikaido, Marmelstein, Murray & Oram LLP

[57] ABSTRACT

A control system for an electric vehicle includes an accelerator opening detecting device for detecting a position of an accelerator, and an output command value calculating device connected to the accelerator opening detecting device for calculating an output command value of a drive motor of the electric vehicle based upon the detected accelerator opening. A motor control device is connected to the output command value calculating device, and controls the output of the motor based upon the output command value. An accelerator opening learning device learns actual accelerator opening positions, and includes at least one of a full-closure learning apparatus for generating a full-closure determined value of the accelerator based upon an output of the accelerator opening detecting device, and a full-open learning apparatus for generating a full-open determined value based upon the detected accelerator opening. The system also includes an output command value limiting device for limiting the output command value output by the output command value calculating device until the accelerator opening learning device has generated the full-closure determined value and the full-open determined value. This configuration reduces the rough and unstable output changes of a motor until the learning has been completed.

21 Claims, 7 Drawing Sheets

CONTROL SYSTEM FOR ELECTRIC VEHICLE

BACKGROUND OF THE INVENTION

1. Field of the Invention

The present invention relates to an electric vehicle control system for calculating an output command value of a motor based upon a detected accelerator opening, to control the output of the motor on the basis of the output command value.

2. Description of the Related Art

Generally, in electric powered vehicles, an output command value of the motor is determined based upon the accelerator opening and the rotational speed of the motor. In order to compensate for manufacturing mounting errors or other assembly errors in an accelerator opening sensor which detects an amount of accelerator opening, the difference between the full-closure determined value and the full-open determined value of the accelerator opening is set within a narrow range, and this difference between the full-closure determined value and the full-open determined value is widened to an ordinary range by determining or learning the actual accelerator opening as the vehicle travels.

Before the determination of actual accelerator opening, when the difference between the full-closure determined value and the full-open determined value is set within a narrow range, the change in the motor output with the operation stroke of the accelerator pedal is larger than normal. As a result, motor output is not smoothly delivered, deteriorating driveability and reducing the comfort of the vehicle.

SUMMARY OF THE INVENTION

The present invention has been made in view of the background described above and has an object of preventing the deterioration in the drive feeling of the vehicle and improving before the learning of the full-closure determined value or the full-open determined value of the accelerator opening.

In a first embodiment of the invention, an output command value calculating means calculates the output command value of the motor based upon the accelerator opening detected by the accelerator opening detecting means. Motor control means controls the output of the motor on the basis of the output command value of the motor. A full-closure learning means of the accelerator opening learning means updates the full-closure determined value of the accelerator opening from the initial opening based upon the detected accelerator opening. In the alternative, the full-open learning means updates the full-open determined value of the accelerator opening upward from the initial opening based upon the detected accelerator opening, so that the difference between the full-closure determined value and the full-open determined value is increased. Until the learning is completed, or until the difference between the full-closure determined value and the full-open determined value is increased, the output command value limiting means limits the output command value of the motor to prevent the motor output from abruptly changing. This makes it possible not only to prevent the rough and jerky motor output which results in poor driveability, but also to inform the driver of the fact that the learning period has not yet completed.

BRIEF DESCRIPTION OF THE DRAWINGS

The present invention will be described in detail with reference to the accompanying drawings, wherein.

DETAILED DESCRIPTION OF THE PREFERRED EMBODIMENTS

Figure 1:
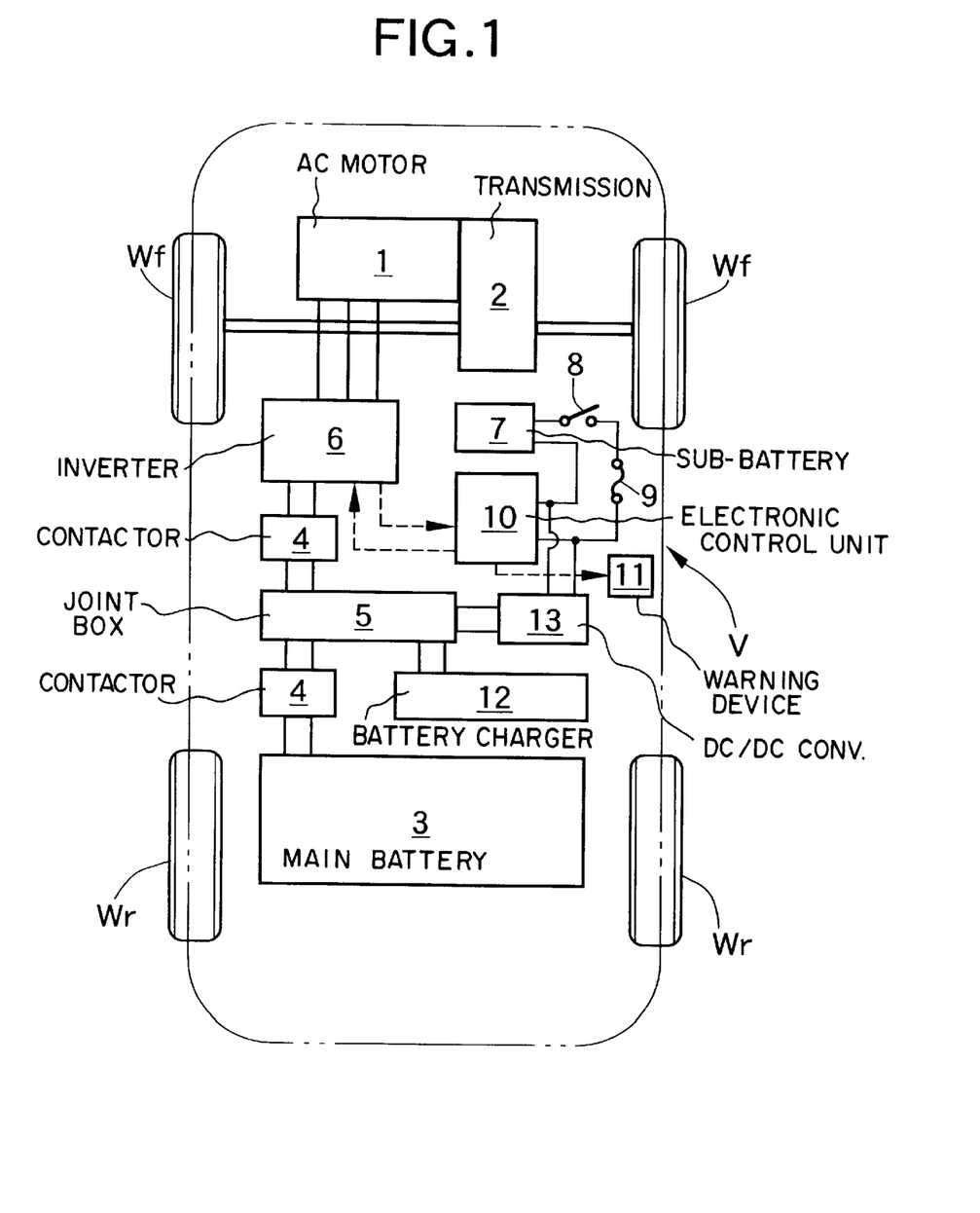
FIG. 1 is a diagram showing the entire construction of an electric vehicle employing the invention.
Figure 2:
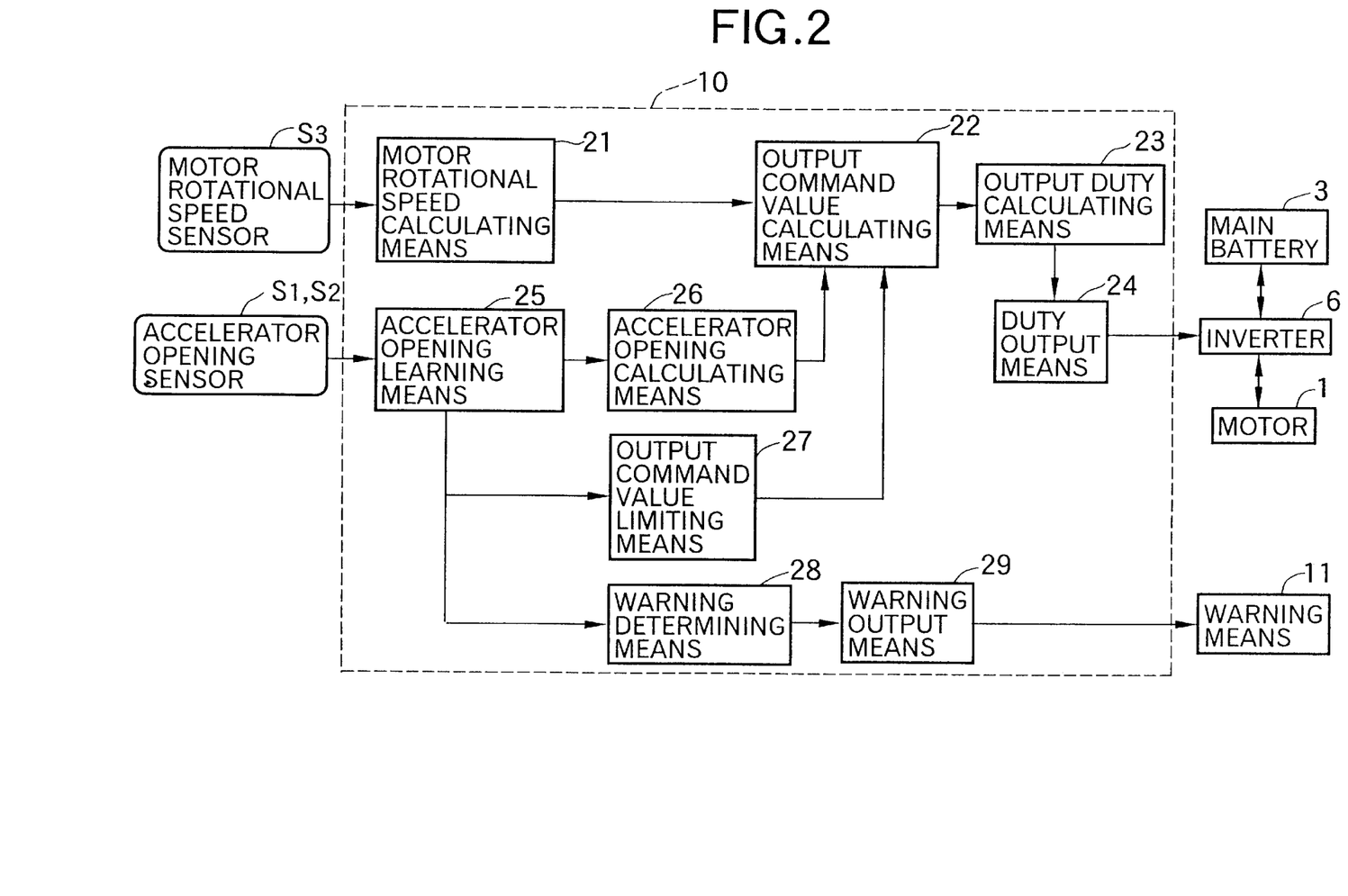
FIG. 2 is a block diagram of a control system according to the invention.

As shown in FIGS. 1 and 2, a four-wheeled electric vehicle V is provided with a pair of right and left front wheels Wf and Wf acting as drive wheels, to which is transmitted the torque of a three-phase AC motor 1 through a transmission 2. A pair of right and left rear wheels Wr and Wr act as driven wheels. A main battery 3, having a voltage of, for example, 288 V, is mounted on the rear portion of the electric vehicle V and is connected with the motor 1 through a contactor 4, a joint box 5, another contactor 4 and an inverter 6 constituting a power drive unit. An electronic control unit 10, connected to a sub-battery 7 of 12 V, for example, through a main switch 8 and a fuse 9, is further connected to the inverter 6 to control the drive torque and the regenerative torque of the motor 1 and to warning means 11 such as a warning lamp or a warning buzzer. A first accelerator opening sensor $S_1$ and a second accelerator opening sensor $S_2$, mounted on an accelerator pedal (not shown), and a motor RPM sensor $S_3$ mounted on the motor 1 are connected to the electronic control unit 10. In order to charge the sub-battery 7 with the electric power of the main battery 3, a battery charger 12 and a DC/DC converter 13 are provided.

Inverter 6 is equipped with a plurality of switching elements, to which are inputted switching signals from the electronic control unit 10 so that the DC power of the main battery 3 is converted into a three-phase AC power and fed to the motor 1 when the motor is driven and so that three-phase AC power generated by the motor 1 during motor driving (regeneration) is converted into DC power and fed to the main battery 3.

The circuit construction and operation of the electronic control unit 10 will be described, with reference to FIG. 2.

The electronic control unit 10 is equipped with motor rotational speed calculating means 21, output command value calculating means 22, output duty calculating means 23, duty output means 24, accelerator opening learning means 25, accelerator opening calculating means 26, output command value limiting means 27, warning determining means 28 and warning output means 29.

The motor RPM calculating means 21 calculates a motor rotational speed Nm on the basis of the output of the motor RPM sensor $S_3$, and the output command value calculating means 22 calculates an output command value $Q_{TRQ}$ by, for example, map-searching on the basis of an accelerator opening $\theta_{AP}$ outputted from the accelerator opening calculating means 26, and the motor rotational speed Nm. When the later-described learning of the accelerator opening $\theta_{AP}$ is not completed in this calculation, the output command value calculating means 22 delays the output command value $Q_{TRQ}$ according to the command from the output command value limiting means 26. Moreover, the output duty calculating means 23 calculates the output duty according to the output command value $Q_{TRQ}$, and the duty output calculating means 24 controls the inverter 6 with the aforementioned output duty.

The accelerator opening learning means 25 detects the failure of the first accelerator opening sensor $S_1$ and the second accelerator opening sensor $S_2$ on the basis of first and second accelerator openings $\theta_{AP-1}$ and $\theta_{AP-2}$, detected by the first and second accelerator opening sensors $S_1$ and $S_2$, respectively, and learns the accelerator opening $\theta_{AP}$. The warning determining means 28 determines a warning output when the first and second accelerator opening sensors $S_1$ and $S_2$ have failed and when the accelerator opening $\theta_{AP}$ has not been learned, to activate the warning means 11 through the warning output means 29.

Figure 3:
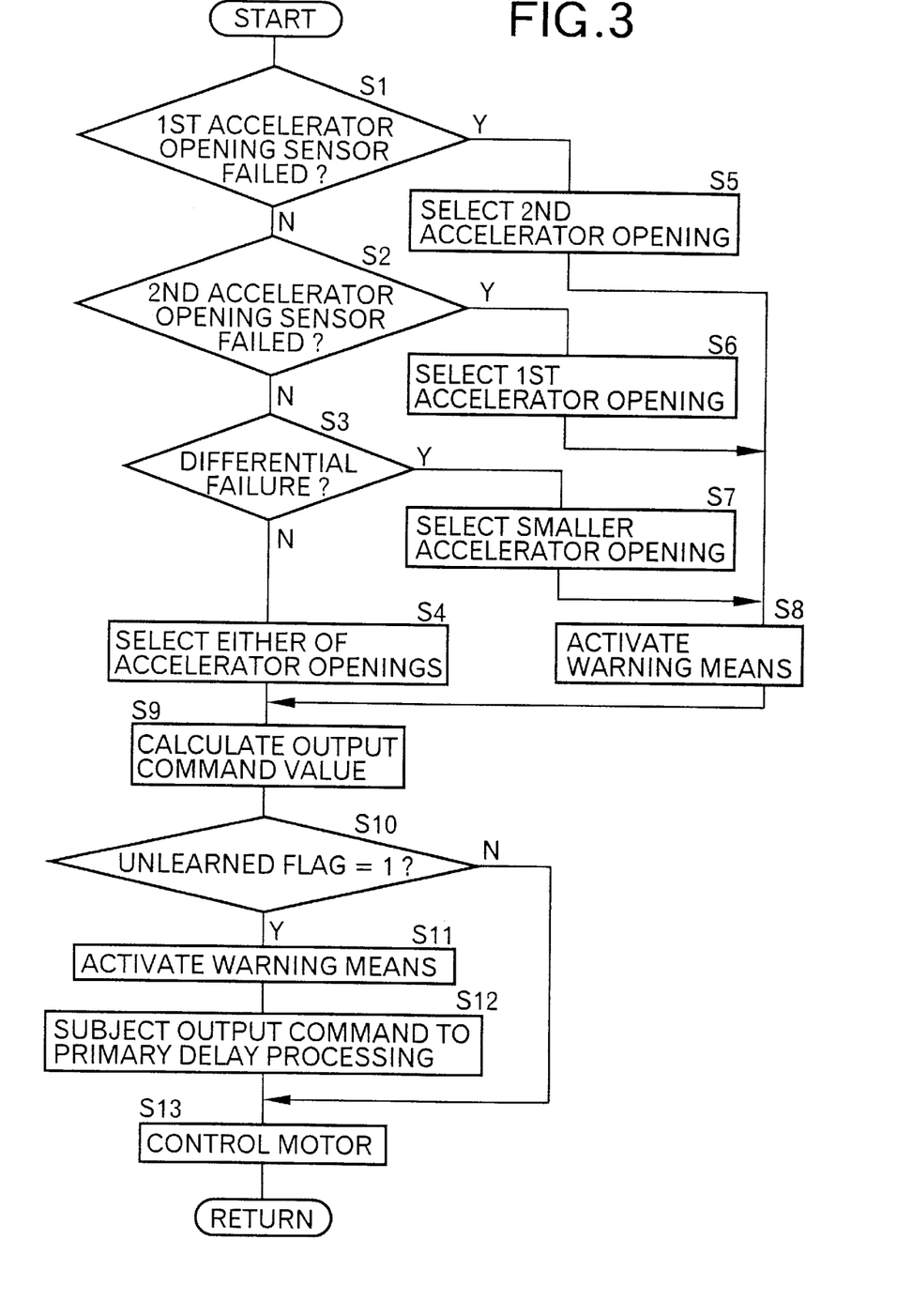
FIG. 3 is a low chart of a main routine.

The operation of the embodiment of the present invention will be described with reference to the flow chart of the main routine of FIG. 3.

Initially, it is judged at Steps S1 and S2 whether or not the first accelerator opening sensor $S_1$ and the second accelerator opening sensor $S_2$ are operating outside of a predetermined operating range; if so, the sensors are judged to have failed. At Step S3, the differential failure of the first and second accelerator opening sensors $S_1$ and $S_2$ is determined.

The first accelerator opening $\theta_{AP-1}$ and the second accelerator opening $\theta_{AP-2}$ output by the first accelerator opening sensor $S_1$ and the second accelerator opening sensor $S_2$, are given predetermined upper limits and lower limits. Therefore, it is determined (see shaded regions of FIGS. 4A and 4B) that the first accelerator opening sensor $S_1$ or the second accelerator opening sensor $S_2$ has failed when the first accelerator opening $\theta_{AP-1}$ or the second accelerator opening $\theta_{AP-2}$ exceeds the aforementioned upper limit due to short circuit, or exceeds the aforementioned lower limit due to wire disconnection, that is, when the first accelerator opening $\theta_{AP-1}$ or the second accelerator opening $\theta_{AP-2}$ exhibits an abnormal value. While the first accelerator opening sensor $S_1$ and the second accelerator opening sensor $S_2$ are normal, the difference between the first accelerator opening $\theta_{AP-1}$ and the second accelerator opening $\theta_{AP-2}$ has a small value which corresponds to an error difference. When the aforementioned difference exceeds a predetermined value, however, it is judged as a differential failure that the first accelerator opening sensor $S_1$ or the second accelerator opening sensor $S_2$ has failed. Said predetermined upper limit and lower limit for determining failure of the first accelerator opening and the second accelerator opening are stored in advance in ROM in the electronic control unit 10.

When it is determined that no failure is detected at Steps S1 to S3, either the first accelerator opening $\theta_{AP-1}$ or the second accelerator opening $\theta_{AP-2}$ is selected as the accelerator opening $\theta_{AP}$ at Step S4. When it is determined at Step S1 that the first accelerator opening sensor $S_1$ has failed, the second accelerator opening $\theta_{AP-2}$ of the non-failed second accelerator opening sensor $S_2$ is selected as the accelerator opening $\theta_{AP}$ at Step S5. When it is determined at Step S2 that the second accelerator opening sensor $S_2$ has failed, the first accelerator opening $\theta_{AP-1}$ of the non-failed first accelerator opening sensor $S_1$ is selected as the accelerator opening $\theta_{AP}$ at Step S6. When it is determined at Step S3 that the differential failure has occurred, the smaller value of the first and second accelerator openings $\theta_{AP-1}$ and $\theta_{AP-2}$ is selected as the accelerator opening $\theta_{AP}$ at Step S7.

When it is determined at Steps S1 to S3 that both the first and second accelerator opening sensors $S_1$ and $S_2$ have failed, the warning means 11 is activated at Step S8 to give a warning to the driver.

Figure 5:
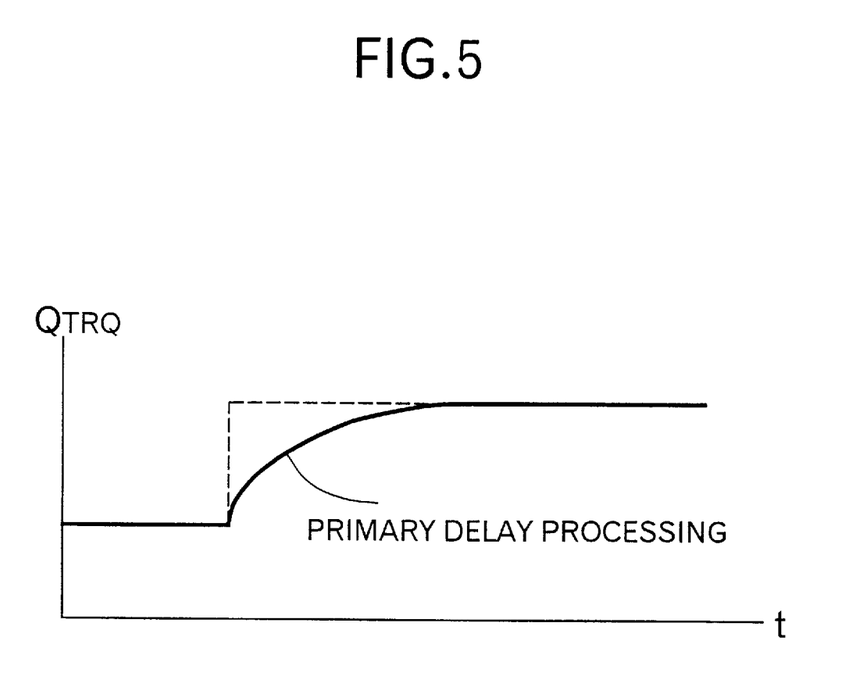
FIG. 5 is a diagram illustrating a change in an output command value $Q_{TRQ}$ by a primary delay processing.

At Step S9, the output command value $Q_{TRQ}$ to be produced in the motor 1 by the driver is calculated on the basis of the preset torque map by using the selected accelerator opening $\theta_{AP}$ and motor rotational speed Nm. When, at Step S10, the accelerator opening $\theta_{AP}$ is unlearned and an unlearned flag $F_1$ is set at "1", the warning means 11 is activated to give a warning to the driver at Step S11, and the increase in the motor output with respect to the depression of the accelerator pedal is limited at Step S12. When the accelerator opening $\theta_{AP}$ rises to raise the output command value $Q_{TRQ}$, as shown in FIG. 5, the output command value $Q_{TRQ}$ is subjected to the primary delay to limit the motor output for a predetermined time period. At Step S13, moreover, the output of the motor 1 is controlled by controlling the inverter 6 at a duty ratio corresponding to the output command value $Q_{TRQ}$.

Both the sensors are rarely out of order at one time, and normally, it is only one of them that would fail. If one of the first and second sensors has failed, the other sensor which has not failed is used for control and the warning means informs that the sensors has failed. Then, the sensor which has failed is repaired before the other sensor fails.

The learning of the accelerator opening $\theta_{AP}$ will now be described with reference to FIGS. 2–6.

The accelerator opening calculating means 26 of FIG. 2 calculates the accelerator opening $\theta_{AP}$ (the calculated value) to be outputted to the output command value calculating means 22. This opening is calculated from the accelerator opening $\theta_{AP}$ (the detected value) selected at Steps S1 to S7 of the flow chart of FIG. 3, based upon the outputs of the first and second accelerator opening sensors $S_1$ and $S_2$. The accelerator opening valves $\theta_{AP}$ (the calculated values) before and after the learning of the accelerator opening are different from each other, and the output change of the motor 1 with the operation of the accelerator pedal before and after the learning is therefore different.

Figure 4A:
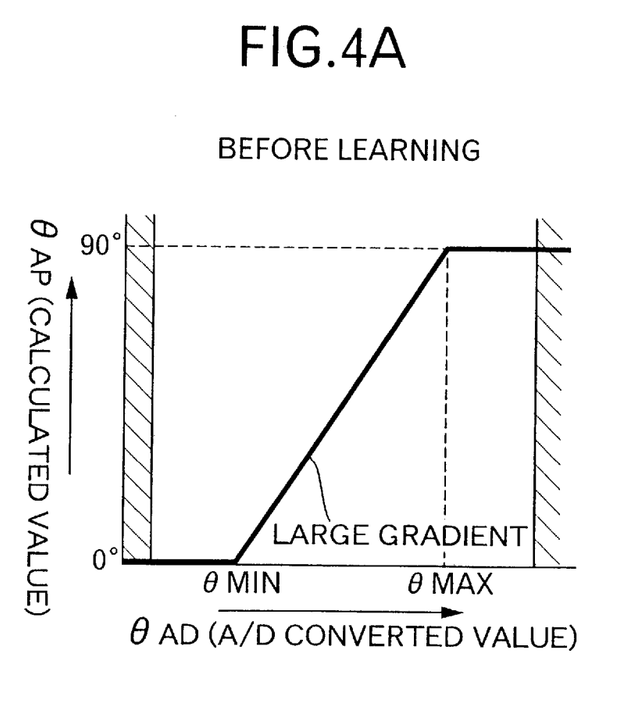
FIGS. 4A and 4B illustrate the characteristics of a calculated accelerator opening value $\theta_{AP}$ with respect to an A/D converted accelerator opening value $\theta_{AD}$.
Figure 4B:
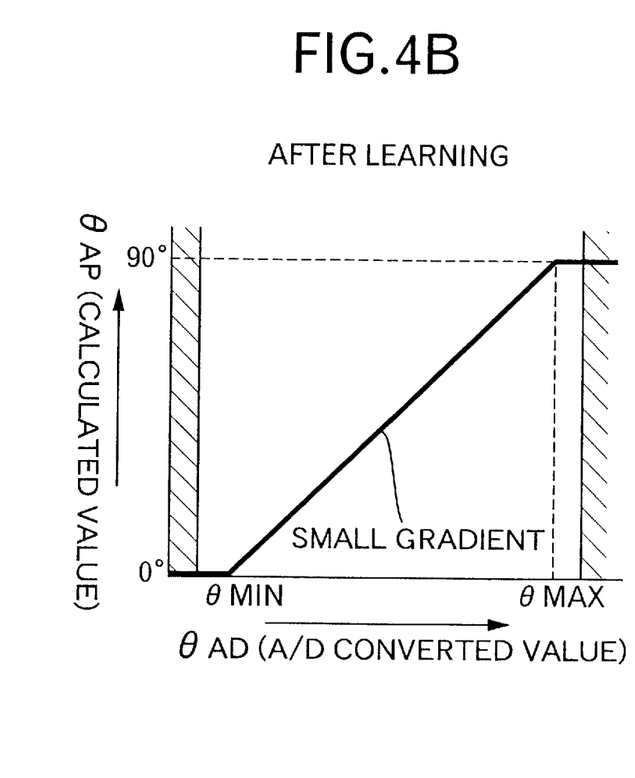

Referring to FIGS. 4A and 4B, the A/D converted $\theta_{AD}$, which is A/D converted from the accelerator opening $\theta_{AP}$ (the detected value) are shown as the abscissas, and the calculated accelerator opening $\theta_{AP}$ are shown as the ordinates. FIG. 4A shows the relationship between $\theta_{AP}$ and $\theta_{AD}$ before learning, and FIG. 4B shows the relationship after learning. In these graphs, symbols $\theta_{MIN}$ and $\theta_{MAX}$ designate a full-closure determined value and a full-open determined value, respectively. These are the initial values stored in the ROM of the electronic control unit 10 before the learning and become the learned values after learning. In the region where the A/D converted accelerator opening $\theta_{AD}$ is less than the full-closure determined value $\theta_{MIN}$, the calculated accelerator opening $\theta_{AP}$ is set at 0 degrees. In the region where the A/D converted accelerator opening $\theta_{AD}$ is not less than the full-open determined value $\theta_{MAX}$, the calculated accelerator opening $\theta_{AP}$ is set at 90 degrees. In the region where the A/D converted accelerator opening $\theta_{AD}$ is not less than the full-closure determined value $\theta_{MIN}$ and less than the full-open determined value $\theta_{MAX}$, the calculated accelerator opening $\theta_{AP}$ increases linearly from 0 degrees to 90 degrees.

When the motor is in the state before the learning, as seen in FIG. 4A, the region between the full-closure initial determined value $\theta_{MIN}$ and the full-open initial determined value $\theta_{MAX}$ is made narrow, while the region less than the full-closure determined value $\theta_{MIN}$ at which the calculated accelerator opening $\theta_{AP}$ is set to 0 degrees, as well as the region not less than the full-open determined value $\theta_{MAX}$ at which the calculated accelerator opening $\theta_{AP}$ is set to 90 degrees, are set to be wide. These settings are made in this manner to ensure that the calculated accelerator opening $\theta_{AP}$ falls to 0 degrees even when the accelerator pedal is released and also ensures that $\theta_{AP}$ rises to 90 degrees even when the accelerator pedal is fully depressed. Failure of opening $\theta_{AP}$ to rise and fall in this manner may otherwise be caused by mounting errors of the first and second accelerator opening sensors $S_1$ and $S_2$. In the state before learning, therefore, in the region from the full-closure determined value $\theta_{MIN}$ to the full-open determined value $\theta_{MAX}$, the change in the calculated accelerator opening $\theta_{AP}$ (i.e., the output change of the motor 1) with the depression of the accelerator pedal is rough and unpredictable.

In the state after learning shown in FIG. 4B, on the other hand, the region from the full-closure determined value $\theta_{MIN}$ to the full-open determined value $\theta_{MAX}$ is widened, so that the output change of the motor 1 with the depression of the accelerator pedal is smooth and predictable.

Figure 6:
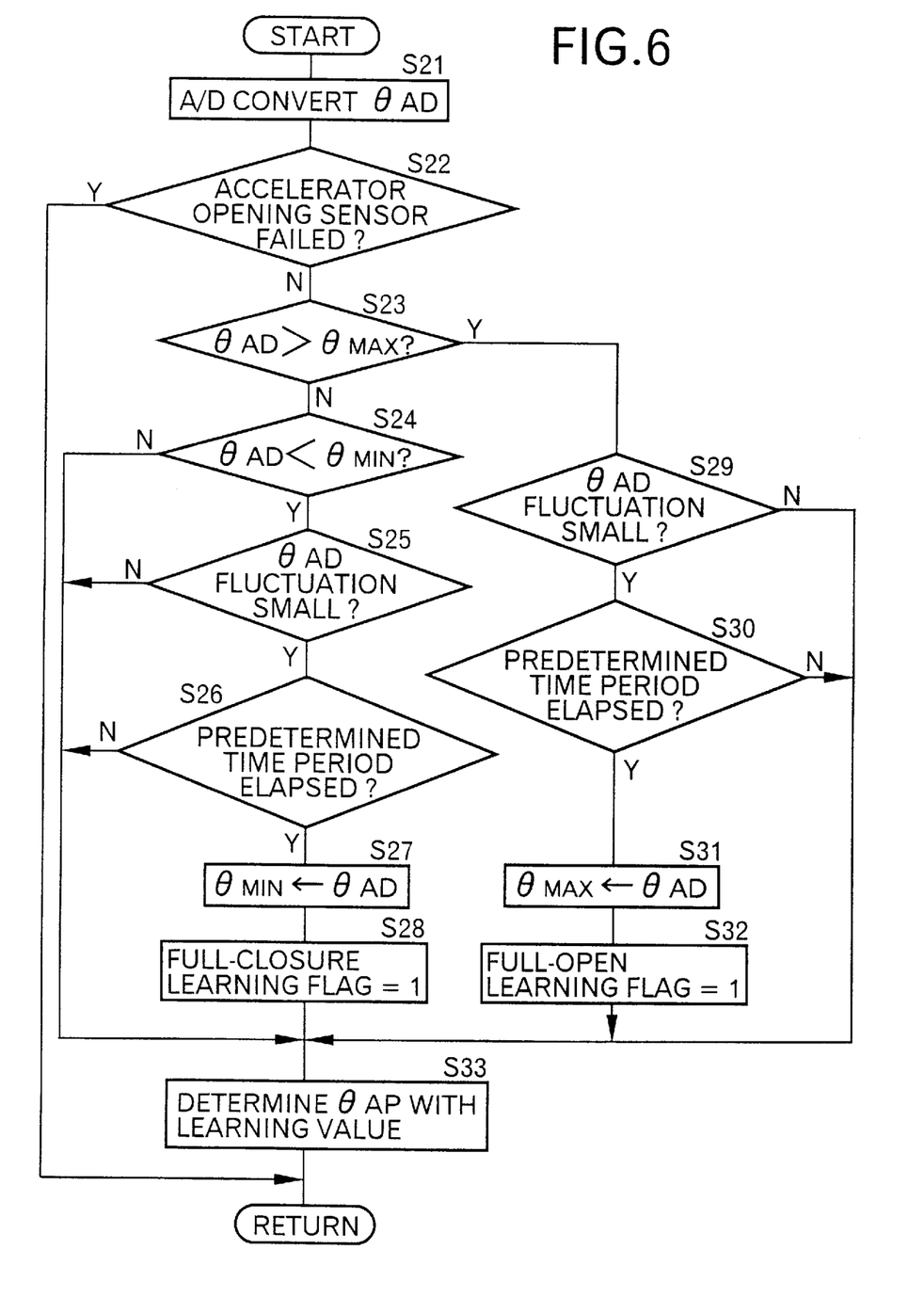
FIG. 6 is a flow chart of an accelerator opening learning routine.

The operation of the system in this region will be described in more detail with reference to the flow chart of FIG. 6. First, at Step S21, the detected accelerator opening $\theta_{AP}$ is A/D converted to calculate the A/D converted accelerator opening $\theta_{AD}$. When it is determined at Step S22 that the accelerator opening sensors $S_1$ and $S_2$ have not failed (refer to Steps S1 to S7 of FIG. 3), the routine advances to Step S23. When it is determined at Steps S23 and S24 that the A/D converted accelerator opening $\theta_{AD}$ is less than the full-closure determined value $\theta_{MIN}$, when it is determined at Step S25 that the fluctuation of the A/D converted accelerator opening $\theta_{AD}$ is less than a predetermined value, and when it is determined at Step S26 that the state continues for a predetermined time period, that is, when the A/D converted accelerator opening $\theta_{AD}$ is stable irrespective of the influence of noise or the like and less than the full-closure determined value $\theta_{MIN}$, the A/D converted value $\theta_{AD}$ is used as the full-closure determined value $\theta_{MIN}$ at Step S27. When the full-closure determined value $\theta_{MIN}$ is thus newly learned, a full-closure learning flag $F_2$ is set at "1" at Step S28.

On the other hand, when it is determined at Step S23 that the A/D converted accelerator opening $\theta_{AD}$ is more than the full-open determined value $\theta_{MAX}$, when it is determined at Step S29 that the fluctuation of the A/D converted accelerator opening $\theta_{AD}$ is less than a predetermined value, and when it is determined at Step S30 that the state continues for a predetermined time period, that is, when the A/D converted accelerator opening $\theta_{AD}$ is stable irrespective of any influence of noise or the like and more than the full-open determined value $\theta_{MAX}$, the A/D converted value $\theta_{AD}$ is used as the full-open determined value $\theta_{MAX}$ at Step S31. When the full-open determined value $\theta_{MAX}$ is thus newly learned, a full-open learning flag $F_3$ is set at "1" at Step S32.

The calculated accelerator opening $\theta_{AP}$ is therefore determined at Step S33 from the A/D converted accelerator opening $\theta_{AD}$ by using the full-closure determined value $\theta_{MIN}$ and the full-open determined value $\theta_{MAX}$.

$$\theta_{AP} = 90 \times \theta_{AD}/(\theta_{MAX} - \theta_{MIN}) - 90 \times \theta_{MIN}/(\theta_{MAX} - \theta_{MIN})$$

As a result, when the vehicle is manufactured at the factory but has not yet been driven, or after the sub-battery 7 on the vehicle is disconnected to cut off the power supply to the electronic control unit 10, the output characteristics of the calculated accelerator opening $\theta_{AP}$ are in the state shown in FIG. 4A. After the vehicle has been driven, the output characteristics change to those shown in FIG. 4B as the vehicle learns from being driven.

Figure 7:
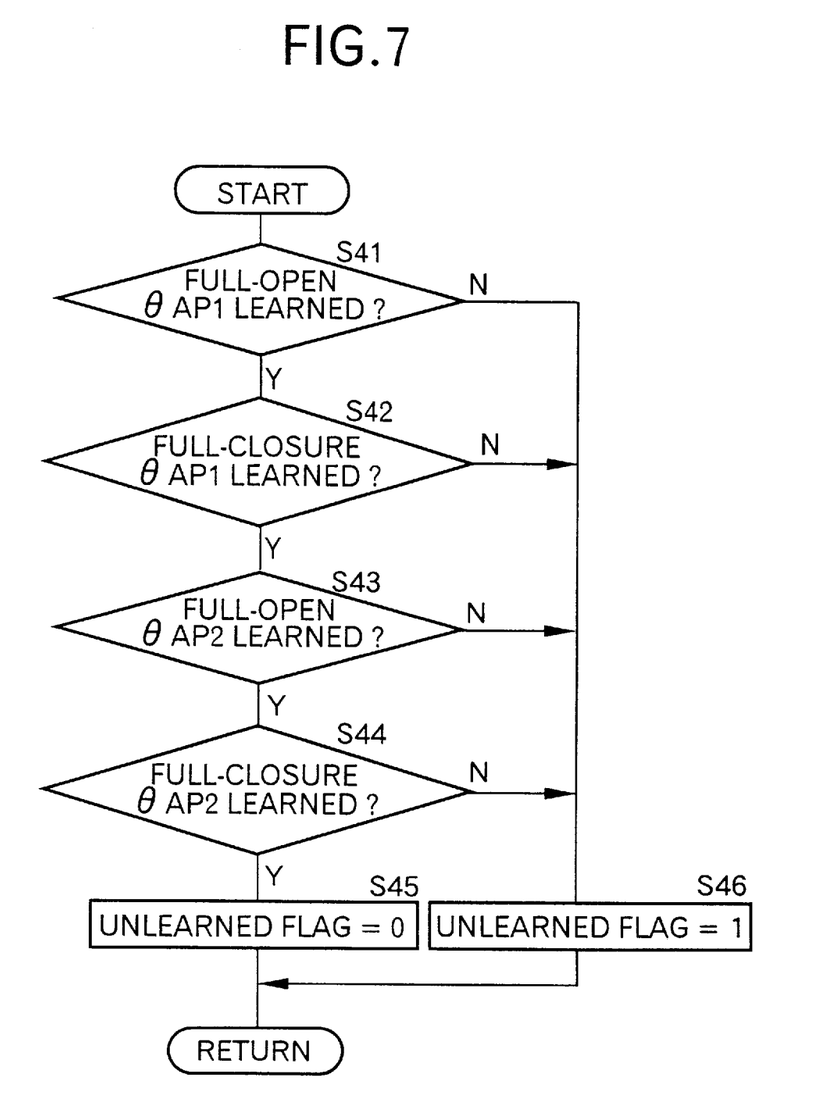
FIG. 7 is a flow chart of an unlearned flag setting routine.

In the flowchart of FIG. 7, when the full-open learning and the full-closure learning of the first accelerator opening $\theta_{AP-1}$ and the full-open learning and the full-closure learning of the second accelerator opening $\theta_{AP-2}$ are completed at Steps S41 to S44, the aforementioned unlearned flag $F_1$ is reset to "0" at Step S45. When any of the learning has not completed, the unlearned flag $F_1$ is held at "1".

When the learning is completed, as described above, the output characteristics of the calculated accelerator opening $\theta_{AP}$ have a small gradient, as illustrated in FIG. 4B, so that the output of the motor 1 does not abruptly change with the accelerator pedal operation of the driver. When the learning has not yet finished, on the other hand, the output characteristics of the calculated accelerator opening $\theta_{AP}$ have a large gradient, as illustrated in FIG. 4A, so that the output change of the motor 1 with the operation stroke of the accelerator pedal would normally be increased. As mentioned previously, this large gradient deteriorates driveability of the vehicle. In the state that the learning is not finished yet, however, the output command value $Q_{TRQ}$ is rounded by the primary delay (Refer to Step S12 of the flow chart of FIG. 3), as shown in FIG. 5, so that the rough operating characteristics of the output change of the motor 1 is resolved, preventing the discomforting effects associated therewith, in such a manner that the driver can recognize the fact that the learning is not finished yet, from the response delay of the output of the motor 1.

Although the present invention has been specifically described in connection with the disclosed embodiment, it can be modified in various ways without departing from the spirit and scope thereof. For example, two accelerator opening sensors $S_1$ and $S_2$ are disclosed, but their number may be, for example, one or three or more. In the disclosed embodiment, moreover, both the full-closure determined value $\theta_{MIN}$ and the full-open determined value $\theta_{MAX}$ of the accelerator opening $\theta_{AP}$ are learned; however, it is sufficient according to the invention to learn only one of them.

According to the invention described above, an electric vehicle control system includes an accelerator opening learning means including at least one of full-closure learning means for updating the full-closure determined value of the accelerator opening downward from the initial opening on the basis of the detected accelerator opening, and full-open learning means for updating the full-open determined value of the accelerator opening upward from the initial opening on the basis of the detected accelerator opening. The electric vehicle control system also includes an output command value limiting means for limiting the output command value of the motor until the end of the learning by the accelerator opening learning means. The tendency for the motor output to abruptly change before the end of the learning is improved, thereby providing a significantly improved drive feeling and to inform the driver of the fact that the learning has not yet finished.

For convenience, the reference numbers in the drawings refer to elements as follows:

| | |
|---|---|
| 1 | Motor |
| 6 | Inverter (Motor Control Means) |
| 22 | Output Command Value Calculating Means |
| 25 | Accelerator Opening Learning Means |
| 27 | Output Command Value Limiting Means |
| $Q_{TRQ}$ | Output Command Value |
| $S_1$ | First Accelerator Opening Sensor (Accelerator Opening Detecting Means) |

-continued

| | |
|---|---|
| $S_2$ | Second Accelerator Opening Sensor (Accelerator Opening Detecting Means) |
| $\theta_{AP-1}$ | First Accelerator Opening (Accelerator Opening) |
| $\theta_{AP-2}$ | Second Accelerator Opening (Accelerator Opening) |
| $\theta_{MIN}$ | Full-Closure Determined Value |
| $\theta_{MAX}$ | Full-Open Determined Value |

We claim:

1. A control system for an electric vehicle, said control system comprising:
   accelerator opening detecting means for detecting a position of an accelerator;
   output command value calculating means coupled to said accelerator opening detecting means for calculating an output command value of a drive motor of the electric vehicle based upon the detected accelerator opening;
   motor control means connected to said output command value calculating means for controlling the output of the motor based upon the output command value;
   accelerator opening learning means for learning actual accelerator opening positions, said accelerator opening learning means comprising at least one of
      full-closure learning means for generating a full-closure determined value of the accelerator based upon an output of the accelerator opening detecting means, and
      full-open learning means for generating a full-open determined value based upon the detected accelerator opening; said system further comprising
         output command value limiting means for limiting the output command value output by the output command value calculating means until said accelerator opening learning means has generated at least one of the full-closure determined value and the full-open determined value.

2. An electric vehicle control system as recited in claim 1, wherein said accelerator opening detecting means comprises first and second accelerator opening sensors.

3. A system as recited in claim 2, further comprising memory means for storing upper and lower limits for outputs of each of said first and second sensors, said system further comprising failure detection means for detecting a failure of one of said first and second sensors when an output of said one of said first and second sensors is outside of a range defined by said predetermined upper and lower limits.

4. A system according to claim 3, further comprising selection means for selecting an output of a non-failed one of said first and second sensors, and wherein said output command value calculating means calculates the output command value based upon the output of said non-failed sensor.

5. A system according to claim 1, wherein said output command value limiting means limits the output command value to provide a smooth output of the motor.

6. A system according to claim 1, wherein, after said accelerator opening learning means has generated at least one of the full-closure determined value and the full-opened determined value, said output command value limiting means no longer limits the output command value.

7. A system as recited in claim 1, wherein said accelerator opening learning means generates at least one of the full-closure determined value and the full-opened determined value upon initial vehicle start-up after vehicle manufacture, or upon initial vehicle start-up after disconnection and re-connection of a battery.

8. A system as recited in claim 1, wherein at least one of said full-closure determined value and said full-open determined value are stored in the accelerator opening learning means.

9. A system as recited in claim 1, further comprising warning means for providing a warning signal to an operator when it is determined that the accelerator opening detecting means has failed, and when it is determined that the accelerator opening learning means has not determined at least one of the full-closure determined value and the full-open determined value.

10. A system as recited in claim 1, further comprising warning means for providing a warning signal to an operator when said output command value limiting means limits the output command value.

11. A system as recited in claim 10, further comprising flag means for generating a flag signal when the accelerator opening learning means has not generated at least one of the full-closure determined value and the full-open determined value, said flag signal signalling the warning means to provide the warning signal to the operator.

12. A system according to claim 1, wherein said output command value limiting means comprises delay means for delaying a change in motor output for a predetermined time period before said accelerator opening learning means learns said actual accelerator opening positions.

13. A system as recited in claim 1, wherein said motor control means comprises an inverter, said inverter being connected to said output command value calculating means, and wherein said output command value limiting means controls a duty ratio input to said inverter to control the output of the motor.

14. A system as recited in claim 1, wherein said output command value limiting means limits the output command value based upon output command value information stored in a memory.

15. A method for controlling an electric vehicle, said method comprising the steps of:
   detecting a position of an accelerator with an accelerator opening detecting means;
   calculating an output command value of a drive motor of the electric vehicle based upon the detected accelerator opening;
   controlling the output of the motor based upon the output command value;
   learning actual accelerator opening positions by at least one of generating a full-closure determined value of the accelerator based upon the detected position of the accelerator, and generating a full-open determined value based upon the detected accelerator opening; and
   limiting the output command value until at least one of the full-closure determined value and the full-open determined value are generated.

16. A method as recited in claim 15, wherein said step of limiting the output command value includes delaying a change in motor output based on the output command value for a predetermined period of time.

17. A method as recited in claim 15, wherein said step of detecting the position of the accelerator comprises a first step of detecting a first position of an accelerator and a second step of detecting a second position of an accelerator, and wherein said step of calculating the output command value is based upon the first and second steps.

18. A method as recited in claim 15, further comprising a step of detecting a failure of acceleration sensors by comparing detected sensor outputs to predetermined upper and lower limits.

19. A method as recited in claim 15, wherein said step of learning actual accelerator opening positions is performed upon initial vehicle start-up after vehicle manufacture, or upon initial vehicle start-up after disconnection and reconnection of a battery.

20. A method as recited in claim 15, further comprising a step of storing at least one of said full-closure determined value and said full-open determined value.

21. A method as recited in claim 15, further comprising a step of generating a warning signal when it is determined that the actual accelerator opening positions have not yet been learned, and when it is determined that a sensor for determining actual accelerator opening position has failed.

* * * * *

UNITED STATES PATENT AND TRADEMARK OFFICE
CERTIFICATE OF CORRECTION

PATENT NO. : 5,883,481

DATED : March 16, 1999

INVENTOR(S) : Ito et al.

It is certified that error appears in the above-identified patent and that said Letters Patent is hereby corrected as shown below:

On the title page, :

Item [30], delete "Mar. 9, 1996" insert therefor

-- Sept. 3, 1996 --

Signed and Sealed this

Twenty-seventh Day of July, 1999

Attest:

Q. TODD DICKINSON

*Attesting Officer*  *Acting Commissioner of Patents and Trademarks*